United States Patent
Yang et al.

(10) Patent No.: US 10,419,942 B2
(45) Date of Patent: Sep. 17, 2019

(54) WIRELESS SIGNAL TRANSMISSION AND RECEPTION METHOD AND DEVICE IN WIRELESS COMMUNICATION SYSTEM INVOLVING A CELL GROUP INCLUDING UNLICENSED BAND CELLS

(71) Applicant: LG ELECTRONICS INC., Seoul (KR)

(72) Inventors: Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 78 days.

(21) Appl. No.: 15/519,806

(22) PCT Filed: Nov. 30, 2015

(86) PCT No.: PCT/KR2015/012903
§ 371 (c)(1),
(2) Date: Apr. 17, 2017

(87) PCT Pub. No.: WO2016/085310
PCT Pub. Date: Jun. 2, 2016

(65) Prior Publication Data
US 2017/0251375 A1  Aug. 31, 2017

Related U.S. Application Data

(60) Provisional application No. 62/085,344, filed on Nov. 28, 2014.

(51) Int. Cl.
*H04L 29/08* (2006.01)
*H04W 16/14* (2009.01)
(Continued)

(52) U.S. Cl.
CPC ............ *H04W 16/14* (2013.01); *H04L 5/001* (2013.01); *H04L 67/1044* (2013.01);
(Continued)

(58) Field of Classification Search
CPC ............ H04W 16/26; H04W 74/0808; H04W 12/0052; H04W 4/08; H04L 67/1044
See application file for complete search history.

(56) References Cited

FOREIGN PATENT DOCUMENTS

| KR | 1020140031203 | 3/2014 | |
|---|---|---|---|
| WO | 2013131250 | 9/2013 | |
| WO | WO-2013131250 A1 * | 9/2013 | ............ H04L 5/001 |

OTHER PUBLICATIONS

R1-144591, "Detailed solutions for carrier selection and LBT for LAA", Nov. 17-21, 2014 (Year: 2014).*
(Continued)

*Primary Examiner* — Salvador E Rivas
(74) *Attorney, Agent, or Firm* — Lee, Hong, Degerman, Kang & Waimey

(57) ABSTRACT

The present invention relates to a wireless communication system and, particularly, to a method and a device therefor, the method comprising the steps of: configuring a cell group including multiple Ucells; identifying subframe configuration information on a particular cell within the cell group; and configuring subframe transmission directions of cells within the cell group so as to be the same at the same time point, on the basis of the subframe configuration information on the particular cell, wherein the particular cell is one Ucell among the multiple Ucells within the cell group when the cell group includes only Ucells, and the particular cell is an Lcell when the cell group includes the Lcell.

10 Claims, 9 Drawing Sheets

(51) Int. Cl.
     *H04W 4/08*          (2009.01)
     *H04W 72/04*        (2009.01)
     *H04L 5/00*          (2006.01)
     *H04W 12/00*        (2009.01)
     *H04W 74/08*        (2009.01)

(52) U.S. Cl.
     CPC ......... *H04W 4/08* (2013.01); *H04W 72/0446* (2013.01); *H04W 12/0052* (2019.01); *H04W 74/0808* (2013.01)

(56) References Cited

OTHER PUBLICATIONS

PCT International Application No. PCT/KR2015/012903, Written Opinion of the International Searching Authority dated Mar. 28, 2016, 14 pages.

LG Electronics, "Data scheduling and control signaling in LAA", 3GPP TSG RAN WG1 Meeting #79, R1-144904, Nov. 2014, 5 pages.

Samsung, "Discussion on Channel Access Mechanisms for LAA", 3GPP TSG RAN WG1 Meeting #79, R1-144739, Nov. 2014, 5 pages.

Huawei, "Detailed solutions for carrier selection and LBT for LAA", 3GPP TSG RAN WG1 Meeting #79, R1-144591, Nov. 2014, 5 pages.

\* cited by examiner

WIRELESS SIGNAL TRANSMISSION AND RECEPTION METHOD AND DEVICE IN WIRELESS COMMUNICATION SYSTEM INVOLVING A CELL GROUP INCLUDING UNLICENSED BAND CELLS

CROSS-REFERENCE TO RELATED APPLICATIONS

This application is the National Stage filing under 35 U.S.C. 371 of International Application No. PCT/KR2015/012903, filed on Nov. 30, 2015, which claims the benefit of U.S. Provisional Application No. 62/085,344, filed on Nov. 28, 2014, the contents of which are all hereby incorporated by reference herein in their entirety.

TECHNICAL FIELD

The present invention relates to a wireless communication system and, more particularly, to a method for transmitting control information in a wireless communication system and an apparatus for the same.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DETAILED DESCRIPTION OF THE INVENTION

Technical Problems

An object of the present invention is to provide a method of efficiently performing a wireless signal transmission/reception process and an apparatus therefor. Another object of the present invention is to provide a carrier aggregation method of effectively securing an available resource duration and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

According to an aspect of the present invention, provided herein is a method of performing communication by a user equipment (UE) in a wireless communication system, including configuring a cell group including a plurality of unlicensed band cells (UCells); identifying subframe configuration information about a specific cell in the cell group; and configuring subframe transmission directions of cells in the cell group to be the same at the same timing, based on the subframe configuration information about the specific cell, wherein, if the cell group includes only the UCells, the specific cell is any one of the UCells in the cell group, and if the cell group includes a licensed band cell (LCell), the specific cell is the LCell.

In another aspect of the present invention, provided herein is a user equipment (UE) for performing communication in a wireless communication system, including a radio frequency (RF) module; and a processor, wherein the processor is configured to configure a cell group including a plurality of unlicensed band cells (UCells), identify subframe configuration information about a specific cell in the cell group, and configure subframe transmission directions of cells in the cell group to be the same at the same timing, based on the subframe configuration information about the specific cell, and wherein, if the cell group includes only the UCells, the specific cell is any one of the UCells in the cell group, and if the cell group includes a licensed band cell (LCell), the specific cell is the LCell.

Configuring subframe transmission directions of cells in the cell group to be same at the same timing may include configuring reserved resource periods (RRPs) on the UCells in the cell group to be the same and each of the RRPs may indicate a resource temporarily configured on each UCell.

The RRP may include a plurality of contiguous downlink (DL) subframes and a plurality of contiguous uplink (UL) subframes subsequent to the DL subframes.

The RRP may include K1 contiguous DL subframes and K1 or fewer contiguous UL subframes subsequent to the K1 contiguous DL subframes.

If signal transmission is scheduled in an (n+1)-th subframe in the RRP, a signal transmission process may be performed according to a carrier sensing result in an n-th subframe, wherein, if a signal related to a parameter indicated by a base station (BS) is detected in the n-th subframe, signal transmission may be performed in the (n+1)-th subframe, and if no signal related to the parameter indicated by the eNB is detected in the n-th subframe, whether signal transmission is performed in the (n+1)-th subframe may be determined according to an energy level in the n-th subframe.

The wireless communication system may be a 3rd generation partnership project (3GPP) wireless communication system.

Advantageous Effects

According to the present invention, wireless signal transmission/reception can be efficiently performed in a wireless communication system. In addition, an available resource duration can be effectively secured through a carrier aggregation method and an apparatus therefor.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present invention.

In a wireless communication system, a user equipment (UE) receives information through downlink (DL) from a base station (BS) and transmits information to the BS through uplink (UL). The information transmitted and received by the BS and the UE includes data and various control information and includes various physical channels according to type/usage of the information transmitted and received by the UE and the BS.

Figure 1:
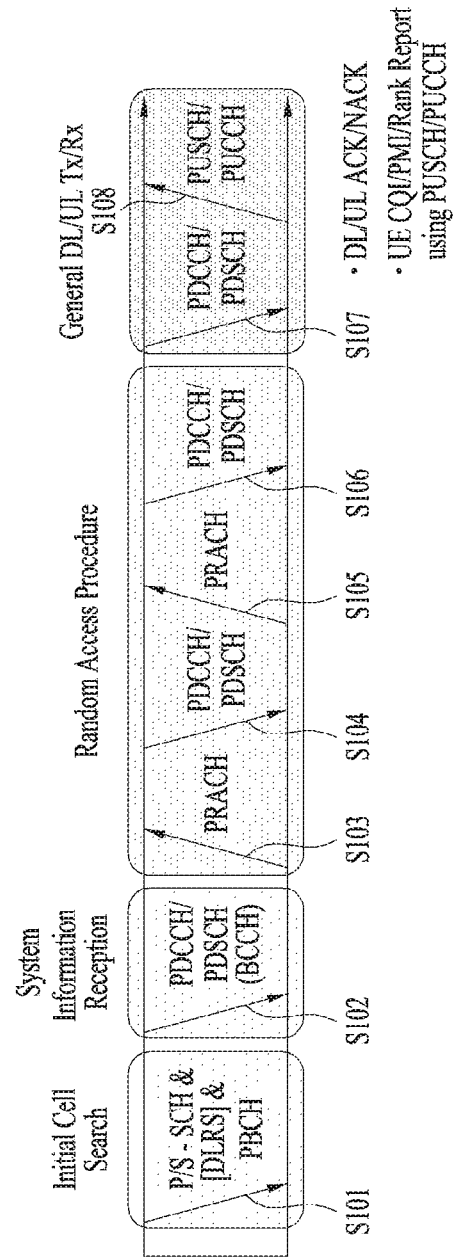
FIG. 1 illustrates physical channels used in 3GPP LTE(-A) and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
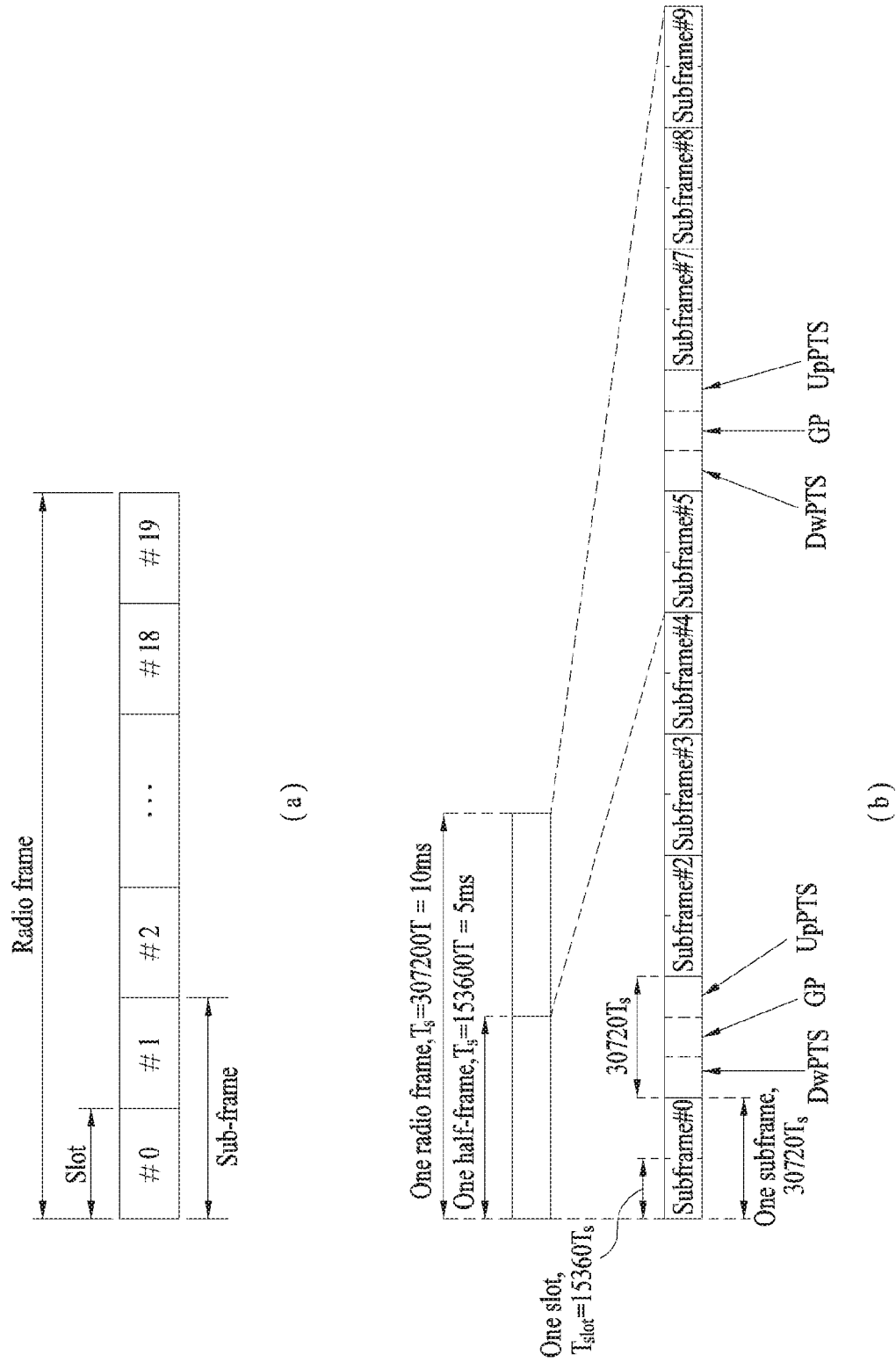
FIG. 2 illustrates a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
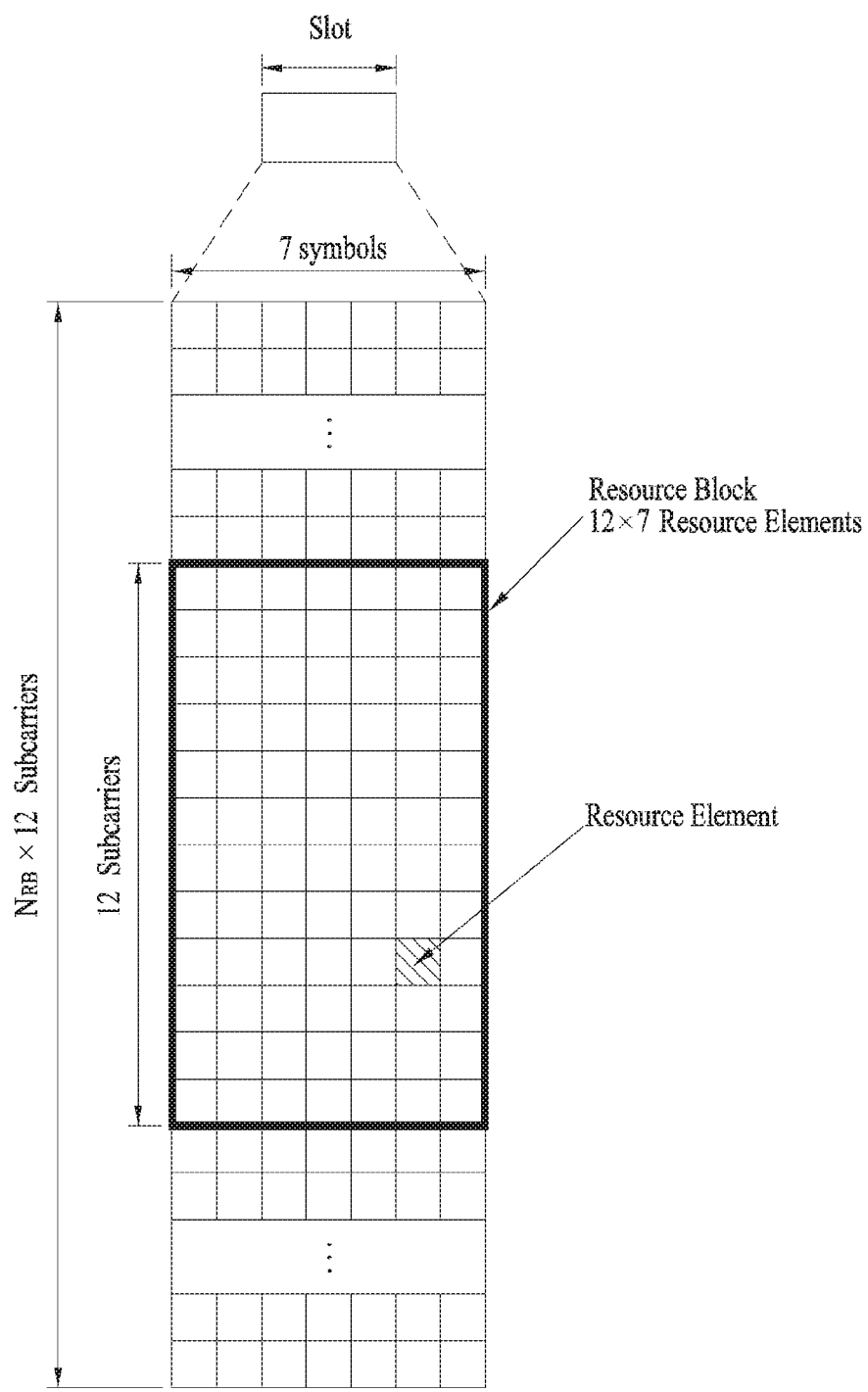
FIG. 3 illustrates a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present invention is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
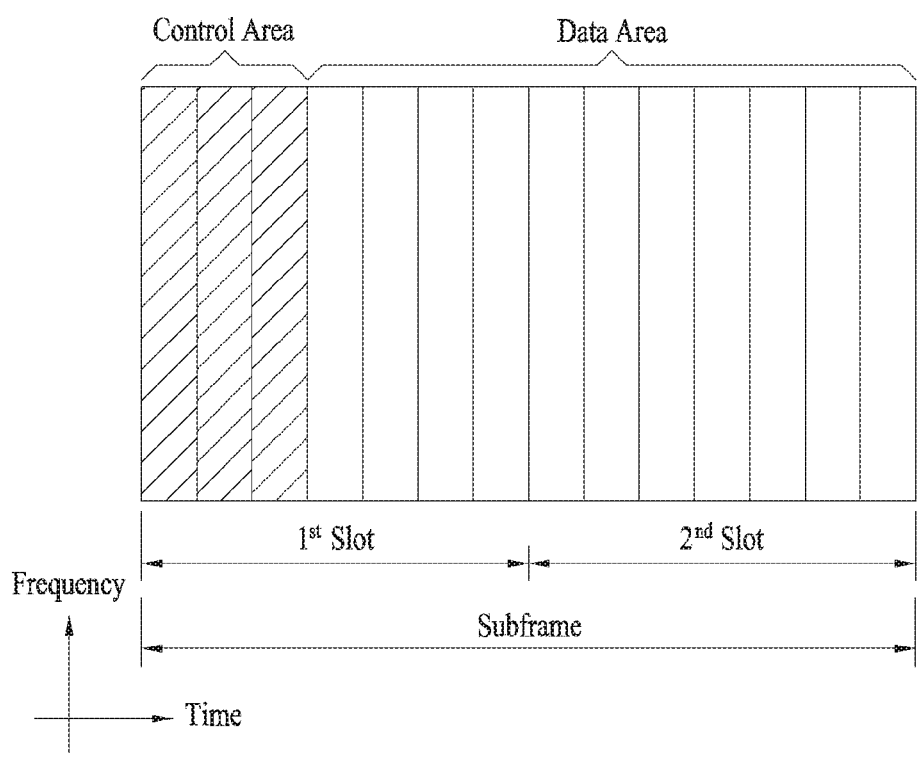
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. A arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Figure 5:
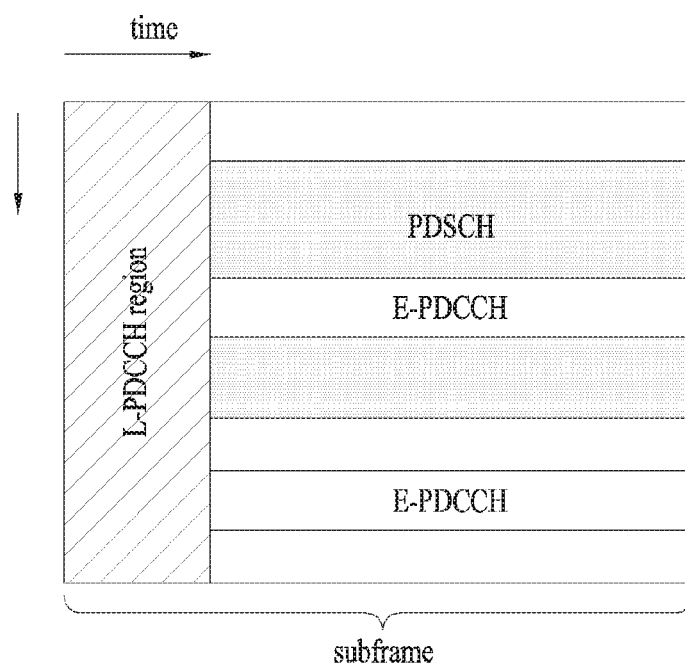
FIG. 5 illustrates an example of Enhanced Physical Downlink Control Channel (EPDCCH).

Transmission Mode (TM)
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO (Multiple Input Multiple Output)
Transmission mode 6: Closed-loop rank-1 precoding
Transmission mode 7: Single-antenna port (ports) transmission
Transmission mode 8: Double layer transmission (ports 7 and 8) or single-antenna port (port 7 or 8) transmission
Transmission mode 9: Transmission through up to 8 layers (ports 7 to 14) or single-antenna port (port 7 or 8) transmission DCI Format
Format 0: Resource grants for PUSCH transmission
Format 1: Resource assignments for single codeword PDSCH transmission (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments FIG. 5 illustrates an EPDCCH. The EPDCCH is a channel additionally introduced in LTE-A.

Referring to FIG. 5, a PDCCH (for convenience, legacy PDCCH or L-PDCCH) according to legacy LTE may be allocated to a control region (see FIG. 4) of a subframe. In the figure, the L-PDCCH region means a region to which a legacy PDCCH may be allocated. Meanwhile, a PDCCH may be further allocated to the data region (e.g., a resource region for a PDSCH). A PDCCH allocated to the data region is referred to as an E-PDCCH. As shown, control channel resources may be further acquired via the E-PDCCH to mitigate a scheduling restriction due to restricted control channel resources of the L-PDCCH region. Similarly to the L-PDCCH, the E-PDCCH carries DCI. For example, the E-PDCCH may carry downlink scheduling information and uplink scheduling information. For example, the UE may receive the E-PDCCH and receive data/control information via a PDSCH corresponding to the E-PDCCH. In addition, the UE may receive the E-PDCCH and transmit data/control information via a PUSCH corresponding to the E-PDCCH. The E-PDCCH/PDSCH may be allocated starting from a first OFDM symbol of the subframe, according to cell type. In this specification, the PDCCH includes both L-PDCCH and EPDCCH unless otherwise noted.

Figure 6:
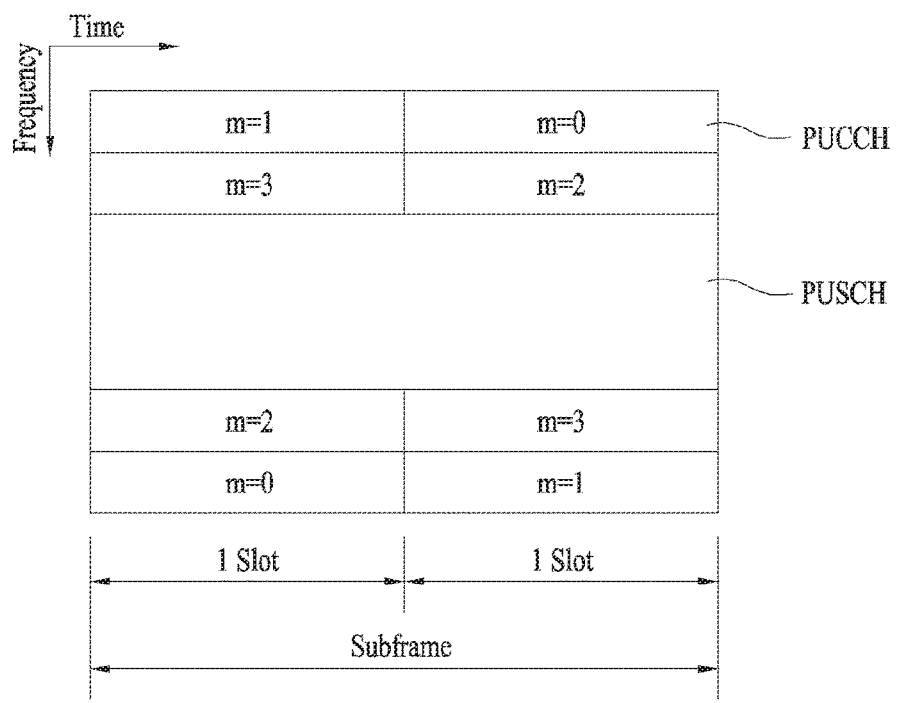
FIG. 6 illustrates the structure of an uplink subframe.

FIG. 6 illustrates an uplink subframe structure.

Referring to FIG. 6, an uplink subframe includes a plurality of (e.g. 2) slots. A slot may include different numbers of SC-FDMA symbols according to CP lengths. For example, a slot may include 7 SC-FDMA symbols in a normal CP case. The uplink subframe is divided into a control region and a data region in the frequency domain. The data region is allocated with a PUSCH and used to carry a data signal such as audio data. The control region is allocated a PUCCH and used to carry control information. The PUCCH includes an RB pair (e.g. m=0, 1, 2, 3) located at both ends of the data region in the frequency domain and hopped in a slot boundary. Control information includes HARQ ACK/NACK, CQI, PMI, RI, etc.

Figure 7:
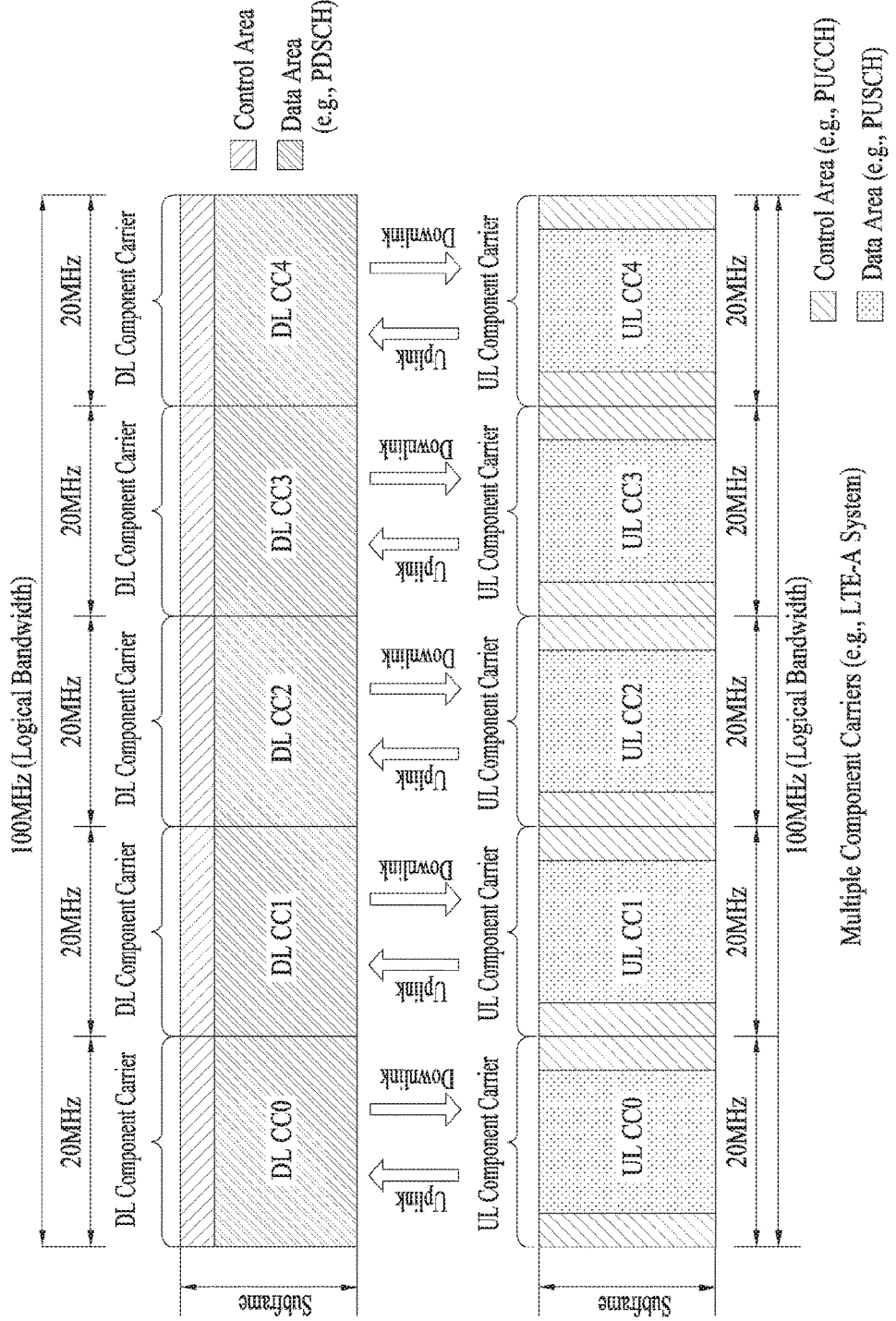
FIG. 7 illustrates a carrier aggregation (CA)-based wireless communication system.

FIG. 7 illustrates carrier aggregation (CA) communication system.

Referring to FIG. 7, a plurality of UL/DL component carriers (CCs) can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. Control information may be transmitted/received only through a specific CC. This specific CC may be referred to as a primary CC and other CCs may be referred to as secondary CCs. For example, when cross-carrier scheduling (or cross-CC scheduling) is applied, a PDCCH for downlink allocation can be transmitted on DL CC #0 and a PDSCH corresponding thereto can be transmitted on DL CC #2. The term "component carrier" may be replaced by other equivalent terms (e.g. "carrier", "cell", etc.).

For cross-CC scheduling, a carrier indicator field (CIF) is used. Presence or absence of the CIF in a PDCCH can be determined by higher layer signaling (e.g. RRC signaling) semi-statically and UE-specifically (or UE group-specifically). The baseline of PDCCH transmission is summarized as follows.

- CIF disabled: a PDCCH on a DL CC is used to allocate a PDSCH resource on the same DL CC or a PUSCH resource on a linked UL CC.
- No CIF
- CIF enabled: a PDCCH on a DL CC can be used to allocate a PDSCH or PUSCH resource on a specific DL/UL CC from among a plurality of aggregated DL/UL CCs using the CIF.
- LTE DCI format extended to have CIF
- CIF corresponds to a fixed x-bit field (e.g. x=3) (when CIF is set)
- CIF position is fixed irrespective of DIC format size (when CIF is set)

When the CIF is present, the BS may allocate a monitoring DL CC (set) to reduce BD complexity of the UE. For PDSCH/PUSCH scheduling, the UE may detect/decode a PDCCH only on the corresponding DL CCs. The BS may transmit the PDCCH only through the monitoring DL CC (set). The monitoring DL CC set may be set UE-specifically, UE-group-specifically or cell-specifically.

Figure 8:
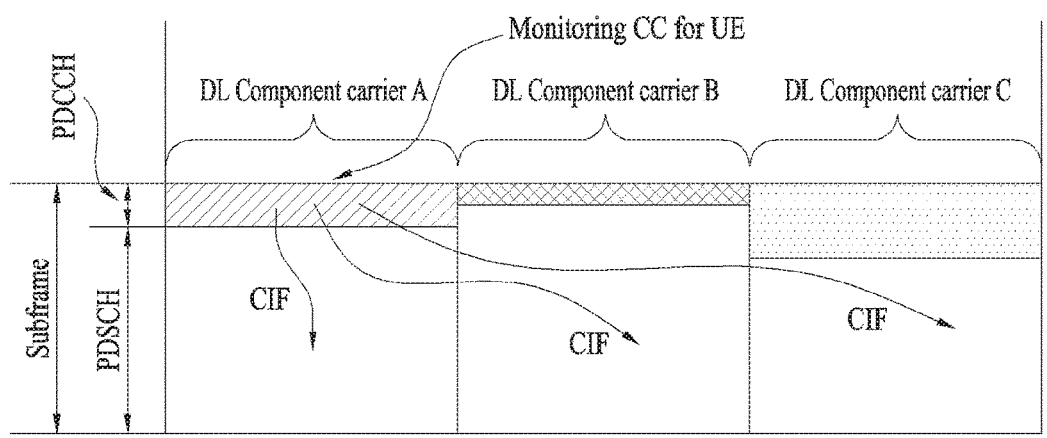
FIG. 8 illustrates a cross-carrier scheduling.

FIG. 8 illustrates scheduling when a plurality of carriers is aggregated. It is assumed that 3 DL CCs are aggregated and DL CC A is set to a PDCCH CC. DL CC A~C may be referred to as a serving CC, serving carrier, serving cell, etc. When the CIF is disabled, each DL CC can transmit only a PDCCH that schedules a PDSCH corresponding to the DL CC without a CIF according to LTE PDCCH rule (non-cross-CC scheduling). When the CIF is enabled through UE-specific (or UE-group-specific or cell-specific) higher layer signaling, a specific CC (e.g. DL CC A) can transmit not only the PDCCH that schedules the PDSCH of DL CC A but also PDCCHs that schedule PDSCHs of other DL CCs using the CIF (cross-scheduling). A PDCCH is not transmitted on DL CC B and DL CC C.

Embodiment: Signal Transmission and Reception in LTE-U

As more and more telecommunication devices require greater communication capacity, efficient utilization of limited frequency bands in future wireless communication systems is increasingly important. Basically, the frequency spectrum is divided into a licensed band and an unlicensed band. The licensed band includes frequency bands reserved for specific uses. For example, the licensed band includes government allocated frequency bands for cellular communication (e.g., LTE frequency bands). The unlicensed band is a frequency band reserved for public use and is also referred to as a license-free band. The unlicensed band may be used by anyone without permission or declaration so long as such use meets radio regulations. The unlicensed band is distributed or designated for use by anyone at a close distance, such as within a specific area or building, in an output range that does not interfere with the communication of other wireless stations, and is widely used for wireless remote control, wireless power transmission, Wi-Fi, and the like.

Cellular communication systems such as LTE systems are also exploring ways to utilize unlicensed bands (e.g., the 2.4 GHz band and the 5 GHz band), used in legacy Wi-Fi systems, for traffic off-loading. Basically, since it is assumed that wireless transmission and reception is performed through contention between communication nodes, it is required that each communication node perform channel sensing (CS) before transmitting a signal and confirm that none of the other communication nodes transmit a signal. This operation is referred to as clear channel assessment (CCA), and an eNB or a UE of the LTE system may also need to perform CCA for signal transmission in an unlicensed band. For simplicity, the unlicensed band used in the LTE-A system is referred to as the LTE-U band. In addition, when an eNB or UE of the LTE system transmits a signal, other communication nodes such as Wi-Fi should also perform CCA in order not to cause interference. For example, in the 801.11ac Wi-Fi standard, the CCA threshold is specified to be −62 dBm for non-Wi-Fi signals and −82 dBm for Wi-Fi signals. Accordingly, the station (STA)/access point (AP) does not perform signal transmission so as not to cause interference when a signal other than Wi-Fi signals are received at a power greater than or equal to −62 dBm. In a Wi-Fi system, the STA or AP may perform CCA and signal transmission if a signal above a CCA threshold is not detected for more than 4 μs.

Figure 9:
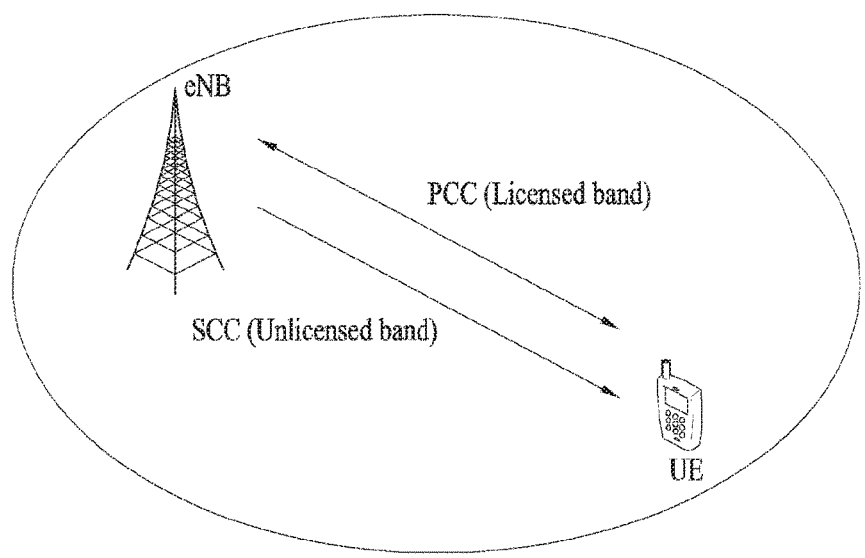
FIG. 9 illustrates carrier aggregation of a licensed band and an unlicensed band.

FIG. 9 illustrates CA of a licensed band and an unlicensed band. Referring to FIG. 9, an eNB may transmit a signal to a UE or the UE may transmit a signal to the eNB, in a CA situation of the licensed band (hereinafter, LTE-A band or L-band) and the unlicensed band (hereinafter, LTE-U band or U-band). Herein, a cell (e.g., a PCell or an SCell) operating on the L-band is defined as an LCell and a carrier of the LCell is defined as a (DL/UL) LCC. In addition, a cell (e.g., an SCell) operating on the U-band is defined as a UCell and a carrier of the UCell is defined as a (DL/UL) UCC. A carrier/carrier-frequency of a cell may represent an operation frequency (e.g., a center frequency). A cell/carrier (e.g., CC) is referred to as a cell.

Figure 10:
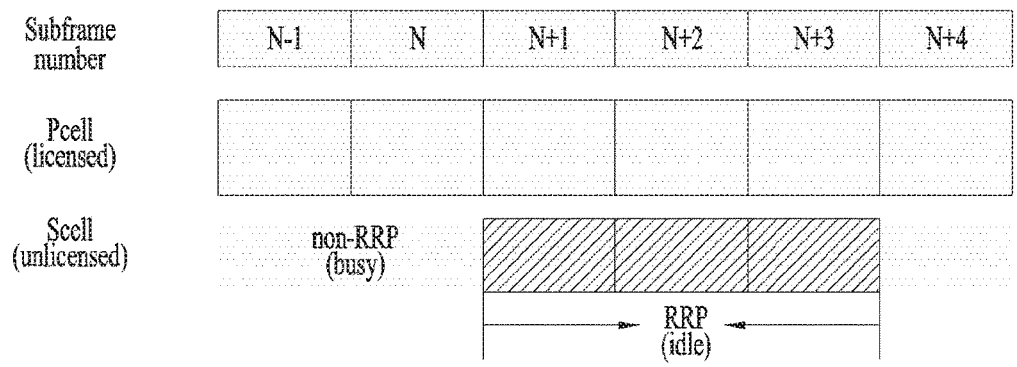
FIGS. 10 and 11 illustrate a resource reservation method on an unlicensed band.
Figure 11:
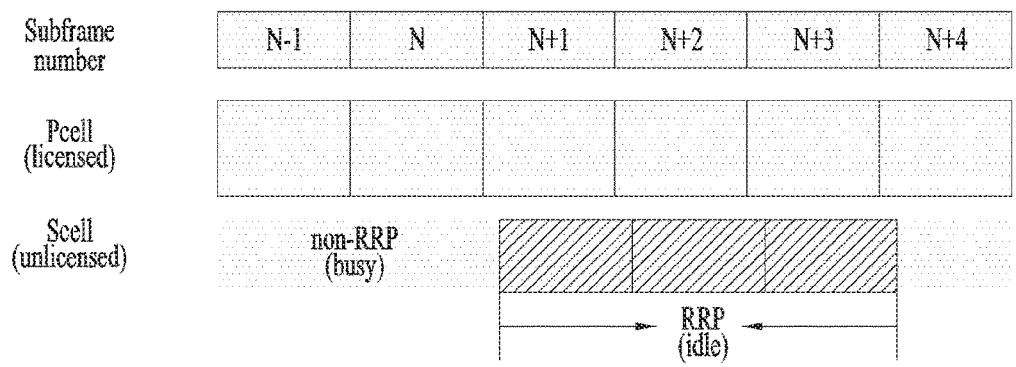

FIGS. 10 and 11 illustrate a resource reservation method on an LTE-U band. In order to perform communication on the LTE-U band, the eNB and the UE are able to occupy/secure the LTE-U band for a specific time duration through contention with other communication systems (e.g., Wi-Fi) is irrelevant to an LTE-A system. For convenience, the time duration occupied/secured for cellular communication on the LTE-U band is referred to as a reserved resource period (RRP). The RRP may represent discontinuously/aperiodically configured resources depending on a carrier sensing result. To secure the RRP, various methods may be used. For example, a specific reservation signal may be transmitted in the RRP so that other communication system devices such as Wi-Fi may recognize that a radio channel is busy. As an example, the eNB may continuously transmit an RS and a data signal in the RRP so that a signal of a specific power level or more may be seamlessly transmitted during the RRP. If the eNB has determined, in advance, the RRP that the eNB desires to occupy on the LTE-U band, the eNB may pre-indicate the RRP to the UE so that the UE may maintain a communication transmission/reception link during the indicated RRP. As a scheme of indicating information about the RRP to the UE, the eNB may transmit the information about the RRP through another CC (e.g., the LTE-A band) connected in the form of CA.

For example, the RRP including M consecutive subframes (SFs) may be configured. Unlike this, one RRP may be configured by an SF set in which SFs are discontinuously present (not shown). In addition, the RRP may be configured only by DL SFs (and/or (?? or) UL SFs) or by a combination of DL SFs and UL SFs, according to a traffic situation. For convenience of description, the RRP configured only by DL (UL) SFs is referred to as a DL (UL) only RRP and the RRP configured by a combination of DL SFs and UL SFs is referred to as a DL/UL mixed RRP. The DL/UL mixed RRP may have a structure including only (single) DL-to-UL switching or a structure including only (single) UL-to-DL switching. Herein, the eNB may pre-inform the UE of RRP configuration information (e.g., the value of M and the usage of M SFs) through higher layer (e.g., RRC or MAC) signaling (using a PCell) or through a physical control/data channel. The start point of the RRP may be periodically set by higher layer (e.g., RRC or MAC) signaling. In addition, if it is desired that the start point of the RRP be set to SF #n, the start point of the RRP may be designated through physical layer signaling (e.g., (E)PDCCH) in SF #n or SF#(n−k) wherein k is a positive integer (e.g., 4).

The RRP may be configured such that an SF boundary or SF number/index configured on an SCell is aligned with that configured on a PCell (hereinafter, aligned-RRP) (see FIG. 10) or the SF boundary or SF number/index configured on the SCell is misaligned with that configured on the PCell (hereinafter, floating-RRP) (see FIG. 11). In the present invention, that SF boundaries between cells are aligned may indicate that an interval between SF boundaries of two different cells is less than a specific time (e.g., CP length or X μs (X≥0)). In addition, in the present invention, the PCell may mean a cell which is referenced to determine the SF (and/or symbol) boundary of a UCell in terms of time (and/or frequency) synchronization.

As another operation example on the LTE-U band operating according to a contention based random access scheme, the eNB may first perform carrier sensing prior to data transmission and reception. The eNB may check whether a current channel state of the SCell is busy or idle and, upon checking that the current channel state of the SCell is idle, the eNB may transmit a scheduling grant (e.g., (E)PDCCH) through the L-band (or PCell) or the U-band (or SCell) and attempt to perform data transmission and reception on the UCell. For convenience, scheduling of the UCell from the same cell is referred to as self-CC scheduling and scheduling of the UCell from another cell (e.g., PCell) is referred to as cross-CC scheduling.

As described above, since an LTE-U system operating based on carrier sensing on the LTE-U band has a structure in which an available resource duration is aperiodically or discontinuously secured/configured, data scheduling/transmission through the LTE-U band has a possibility of being opportunistically/intermittently performed depending only on such a temporarily configured resource duration.

Meanwhile, a situation in which a plurality of UCells operates on the U-band may be considered. In addition, a situation in which an RRP structure (e.g., an RRP start point, an RRP length, an SF configuration in the RRP, etc.) is dynamically/flexibly changed/configured on each UCell according to traffic requirements of the UE may be considered. In this case, UL-to-DL and/or DL-to-UL interference may occur between RRPs of plural UCells that are contiguous or relatively near in frequency (because the RRP start point, RRP length, and SF configuration differ). In this case, inter-cell UL-DL interference may be UE-specifically or UE-commonly generated according to situation. Therefore, in consideration of inter-cell UL-DL interference, a method of stably establishing RRP durations/configurations of plural UCells or effectively controlling an influence of inter-UCell interference is needed.

Hereinafter, a CA method and a resource allocation/configuration method of effectively securing an available resource duration in a situation in which a plurality of cells/carriers is configured are proposed. Herein, the plural cells include one or more cells operating on an L-band and one or more cells on which an available resource duration is aperiodically or discontinuously secured/configured. The present invention may be applied to an LTE-U system opportunistically operating on the U-band based on carrier sensing. The present invention may also be applied to a situation in which an LTE-U scheme is configured in a plurality of cells. Specifically, the present invention proposes CA of a plurality of UCells, a control method therefor, and an RRP configuration method suitable for the UCells, in a situation in which an RRP is dynamically/flexibly set/configured.

For convenience, it will be assumed hereinbelow that one L-band and one U-band are carrier-aggregated for a UE and wireless communication is performed through the carrier-aggregated bands. For example, a CA situation between a PCell operating on a legacy L-band and an SCell operating according to the LTE-U scheme is considered. However, the proposed methods of the present invention may be applied to a situation in which a plurality of L-bands and a plurality of U-bands are carrier-aggregated. In addition, the present invention may be applied even to the case in which data transmission/reception is performed between the eNB and the UE only on the U-band. The proposed methods of the present invention may be extended not only to a 3GPP LTE system but also to systems having other characteristics. Hereinbelow, the eNB will be used as an extensive term including remote radio head (RRH), base station (BS), transmission point (TP), reception point (RP), relay, etc.

(1) CA Between Multiple UCells and Control Method Therefor

To solve inter-cell UL-DL interference when an RRP is dynamically/flexibly changed/configured on each UCell, a method of configuring a UCell group in which SF directions (on the RRP) are configured to be the same at the same timing is proposed. More generally, a method of configuring a cell group including a legacy LCell deployed on an L-band, in which SF directions are configured to be the same at the same timing is proposed. The cell group may include only UCells or include both UCells and LCells. In addition, in consideration of transmission/reception (switching) operation complexity of a UE, a UCell group using/configuring the same RRP type (e.g., one of two (or three) types of a DL (UL) only RRP and a DL/UL mixed RRP or one of three (or four) types of a DL (UL) only RRP, a DL-to-UL RRP, and a UL-to-DL RRP) or the same RRP type set may be configured. Accordingly, in the following description, an SF direction may be replaced with an RRP type.

As one method, in a cell group including only UCells, SFs on UCells may be configured to be aligned with an SF direction of a specific UCell (hereinafter, a reference UCell). The reference UCell may be designated by an eNB when a cell group is designated/configured. In this case, the eNB may signal RRP configuration information about the reference UCell to a UE. Then, the UE may perform a signal transmission/reception operation under the assumption that an RRP is configured to be the same as the reference UCell even in other UCells in the cell group (or that an RRP having the same SF direction as the reference UCell may be configured even on other UCells at an RRP configuration timing on the reference UCell). In addition, in a cell group including both LCells and UCells, SF directions of the UCells may be configured to be aligned with SF directions of the LCell. As another method, if a UCell group is configured, SF directions (at the same timing) are configured to be the same on all UCells in the group or the same RRP type may be used/configured. In this case, if an RRP for any one UCell in the cell group is configured, the UE may perform a signal transmission/reception operation under the assumption that an RRP is identically configured with respect to the other UCells in the cell group (or that an RRP having the same SF direction as any one UCell may be configured with respect to the other UCells at an RRP configuration timing of the corresponding UCell). As another method, to simplify a transmission/reception (switching) operation of the UE, (without additionally designating a UCell group based on the same SF direction or the same RRP type) SF directions (and/or RRP types) on all UCells carrier-aggregated for one UE may be identically configured or SF directions at the same timing on all UCells carrier-aggregated for one UE may be identically configured.

Meanwhile, as another method for solving inter-cell interference, if SF directions (on an RRP) of a plurality of specific UCells (or a plurality of predesignated UCells regardless of the UCell group) in a UCell group are differently configured at the same timing, the UE may operate as follows.

Alt 1) The UE may perform a signal (e.g., PDSCH or PUSCH) transmission/reception operation only on UCells in which SFs aligned with a (predesignated) specific SF direction (e.g., DL or UL) or an SF direction configured for a specific UCell (hereinafter, a reference UCell) (an LCell when a cell group including the LCell is considered) are configured among a plurality of UCells. Accordingly, the UE may omit/drop signal transmission/reception on a UCell in which an SF having an SF direction different from an SF direction configured on the reference UCell (or LCell) is configured, even though signal (e.g., PDSCH or PUSCH) transmission/reception is scheduled on the corresponding cell. As signal transmission is omitted/dropped, a carrier sensing procedure performed to identify whether a radio channel state (i.e., idle or busy) prior to signal transmission may be omitted/skipped. In a cell group including only UCells, the reference UCell may be designated by the eNB. If the LCell is a TDD cell, an SF direction of the LCell may be determined according to a UL-DL configuration of Table 1.

Alt 2) An independent DL CSI measurement/reporting and/or UL power control process may be applied to an SF direction collision timing (hereinafter, a collided SF) (between UCells) separately from an SF direction aligned timing (hereinafter, an aligned SF) (without additional restriction on a transmission/reception operation).

In Alt 2, when the UE performs DL CSI measurement/reporting, an independent periodic CSI process (e.g., a CSI content type or a reporting timing/period) may be applied to the aligned SF and the collided SF. In addition, when a (PUSCH based) aperiodic CSI request is performed, whether a CSI measurement target SF is the aligned SF or the collided SF may be indicated through corresponding UL grant DCI. In Alt 2, when a UL power control (PC) process is performed, independent open-loop PC parameters (e.g., $P_{O\_PUSCH,c}(j)$) may be configured for the aligned SF and the collided SF. $P_{O\_PUSCH,c}(j)$ denotes a parameter/offset value used for power control for PUSCH transmission in SF #j of cell #c. In addition, TPC commands (e.g., δPUSCH,c) may be separately accumulated with respect to the aligned SF and the collided SF (i.e., only in SFs of the same type).

Meanwhile, in terms of SF directions and SF collision, a DL SF (UCell) in the present invention may include not only a time duration during which the eNB transmits/can transmit a signal for the purpose of data scheduling/transmission but also a time duration during which the eNB transmits/can transmit a specific signal (hereinafter, a reservation signal) for the purpose of radio channel reservation on the UCell. In addition, a UL SF (UCell) in the present invention may include not only a time duration during which the UE transmits/can transmit data/control information but also a time duration during which the UE transmits/can transmit the reservation signal on the UCell. From the same perspective, an SF (e.g., a TDD special SF) of a type in which a DL transmission symbol/duration and a UL transmission symbol/duration coexist may be included 1) both in the DL SF and in the UL SF or 2) in the DL SF when only DL data scheduling is configured to be performed in the corresponding SF and in the UL SF when only UL data scheduling is configured to be performed in the corresponding SF.

(2) DL/UL Mixed RRP Configuration Scheme on UCell

In this example, a DL/UL mixed RRP configuration scheme considering UL self-CC scheduling on a UCell is proposed. Herein, UL self-CC scheduling means a structure in which UL grant DCI for scheduling PUSCH transmission on the UCell and a PHICH corresponding to a PUSCH are transmitted on the UCell. Specifically, assuming that a time delay consumed for a UL grant/PHICH-to-PUSCH and a PUSCH-to-PHICH/UL grant for a DL-to-UL RRP and a UL-to-DL RRP, respectively, is 4 SFs (or, 4 ms), the following SF configurations (e.g., RRP configurations) may be considered. For convenience, DL and UL are referred to as D and U, respectively.

In this example, an SF configuration (e.g., RRP configuration) may be pre-shared between the eNB and the UE. As an example, upon adding/configuring a UCell for the UE, the eNB may inform the UE of information about an RRP pattern applied to the UCell (e.g., an RRP pattern index) through higher layer signaling (e.g., RRC signaling or Layer 2 (L2)) and then, upon transmitting a UL/DL grant PDCCH, include, in the UL/DL grant PDCCH, information about in which place on an RRP a DL SF in which the UL/DL grant PDCCH is transmitted is located. As another example, a method may be considered in which a bitmap corresponding to an RRP SF pattern is included in the UL/DL grant PDCCH, a bit value corresponding to a DL SF in which the UL/DL grant PDCCH is transmitted is set to 1 and the other bit value of the bitmap is set to 0.

<DL-to-UL RRP>

Case 1) Four (or Four or More) DL SFs+Four or Fewer UL SFs (e.g., DDDDU or DDDDUU or DDDDUUU or DDDD-UUUU)

A PUSCH of a UL SF (e.g., SF #n) may be scheduled by a PHICH/UL grant transmitted/received through a DL SF configured in SF #(n−4). No PHICH/UL grant is transmitted/received and/or only a DL grant may be transmitted/received through the other DL SFs. Accordingly, the UE may perform a reception processing process (e.g., decoding) of a control channel under the assumption that the PHICH/UL grant/DL grant can be transmitted/received in a DL SF with a corresponding UL SF in an RRP. On the other hand, the UE may perform a reception processing process (e.g., monitoring or decoding) of a control channel under the assumption that no PHICH/UL grant is transmitted/received and/or only the DL grant may be transmitted/received in a DL SF without a corresponding UL SF in the RRP. For example, the UE may omit/drop the reception processing process (e.g., monitoring or decoding) of the PHICH/UL grant. In addition, even when the PHICH/UL grant is detected, the UE may omit/drop a PUSCH transmission process according to detection of the PHICH/UL grant.

<UL-to-DL RRP>

Case 2) Four or Fewer UL SFs+Four (or Four or More) DL SFs (e.g., UDDDD or UUDDDD or UUUDDDD or UUUUDDDD)

A PHICH/UL grant corresponding to a PUSCH of a UL SF (e.g., SF #n) may be transmitted/received by a DL SF configured in SF #(n−4). No PHICH/UL grant is transmitted/received and/or only a DL grant may be transmitted/received through the other DL SFs. Accordingly, the UE may perform a reception processing process (e.g., decoding) of a control channel under the assumption that the PHICH/UL grant/DL grant can be transmitted/received in a DL SF with a corresponding UL SF in an RRP. On the other hand, the UE may perform a reception processing process (e.g., monitoring or decoding) of a control channel under the assumption that no PHICH/UL grant is transmitted/received and/or only the DL grant may be transmitted/received in a DL SF without a corresponding UL SF in the RRP. For example, the UE may omit/drop the reception processing process (e.g., monitoring or decoding) of the PHICH/UL grant. In addition, even when the PHICH/UL grant is detected, the UE may omit/drop a PUSCH transmission process according to detection of the PHICH/UL grant.

More generally, assuming that a time delay consumed for a UL grant/PHICH-to-PUSCH is K1 SFs (or K1 ms) and a time delay consumed for a PUSCH-to-PHICH/UL grant is K2 SFs (or K2 ms), the following SF configurations may be considered.

<DL-to-UL RRP>

Case 1) K1 (or K1 or More) DL SFs+K1 or Fewer UL SFs

A PUSCH of a UL SF (e.g., SF #n) may be scheduled by a UL grant/PHICH transmitted/received through a DL SF configured in SF #(n−K1). The UL grant/PHICH may not be transmitted/received and/or only a DL grant may be transmitted/received through the other DL SFs.

<UL-to-DL RRP>

Case 2) K2 or Fewer UL SFs+K2 (or K2 or More) DL SFs

A PHICH/UL grant corresponding to a PUSCH of a UL SF (e.g., SF #n) may be transmitted/received through a DL SF configured in SF #(n+K2). The PHICH/UL grant may not be transmitted/received and/or only a DL grant may be transmitted/received through the other DL SFs.

(3) Carrier Sensing Method Based on LTE-U Signal Detection

Upon considering a situation in which a device (e.g., eNB or UE) performing transmission of a specific signal/channel through a UCell in an LTE-U system performs a carrier sensing operation, the eNB and the UE may be requested to perform carrier sensing for a radio channel of the UCell prior to DL signal/channel transmission and UL signal/channel transmission, respectively. In this case, in a situation in which a specific SF configuration (e.g., RRP type) is considered, it may be effective to perform carrier sensing based on LTE-U signal detection (rather than simple energy/power level detection), for contiguous UCell radio channel reservation/occupation of the LTE-U system. Herein, LTE-U signal detection means detection of a signal transmitted by another LTE-U device (e.g., eNB or UE). The LTE-U signal indicates a wireless signal transmitted on the UCell based on 3GPP LTE specifications and LTE-U device indicates an LTE device (e.g., eNB or UE) supporting signal transmission/reception on the UCell. In relation to the LTE-U signal detection based carrier sensing operation, the following three cases may be considered.

Case A) UE Performing Signal/Channel Transmission Through UL SF #(n+1) Immediately after UL SF #n When signal/channel (e.g., PUSCH, PUCCH, or PRACH) transmission reserved/scheduled on a UCell is present in UL SF #(n+1), the UE may perform an operation of detecting an LTE-U signal transmitted by another UE in UL SF #n on the UCell. The UE may determine, through comparison between the detection result (e.g., a correlation value) and a specific threshold value, whether another LTE-U device (e.g., an LTE-U UE) occupies a radio channel of the UCell in UL SF #n. As the comparison result, if it is determined that another LTE-U device occupies the radio channel of the UCell in UL SF #n, the UE may determine that the state of the radio channel of the UCell in UL SF #(n+1) is idle and perform signal/channel (e.g., PUSCH, PUCCH, or PRACH) transmission reserved/scheduled on the UCell in UL SF #(n+1). Meanwhile, if it is determined that a non-LTE-U device occupies the radio channel of the UCell in UL SF #n, the UE may determine that the state of the radio channel of the UCell in UL SF #(n+1) is busy and drop/omit signal/channel transmission reserved/scheduled on the UCell in UL SF #(n+1).

The LTE-U signal, which is a detection target, may be a (PUSCH) DMRS signal or an SRS signal. For more efficient detection, the eNB may pre-signal LTE-U signal transmission related information/parameters to the UE. For example, the LTE-U signal transmission related information/parameters include sequence information constituting the LTE-U signal (e.g., a base sequence or a cyclic shift), a frequency resource on which the LTE-U signal is transmitted (or on which the LTE-U signal is to be detected), a time resource on which the LTE-U signal is transmitted (or on which the LTE-U signal is to be detected) (e.g., an SC-FDMA symbol index), and the specific threshold value used to determine the detection result. The LTE-U signal transmission related information/parameters may be cell-commonly or UE-group-commonly configured.

Meanwhile, a UE performing only SRS signal transmission through the last symbol in UL SF #n (or arbitrary UL SF #n without limiting to Case A) may also perform a carrier sensing operation based on the LTE-U signal (in SF #n) similarly to the above example. In addition, even when the UE operates to perform UL signal/channel (e.g., PUSCH, PUCCH, or PRACH) transmission through symbols except for the first partial symbols in UL SF #n (or arbitrary UL SF #n without limiting to Case A), the UE may perform the carrier sensing operation based on LTE-U signal detection (on first partial symbols of SF #n) similar to the above example.

Case B) UE Performing Signal/Channel Transmission Through UL SF #(n+1) Immediately after DL SF #n When signal/channel (e.g., PUSCH, PUCCH, or PRACH) transmission reserved/scheduled on a UCell is present in UL SF #(n+1), the UE may perform an operation of detecting an LTE-U signal transmitted by the eNB in UL SF #n on the UCell. The UE may determine, through comparison between the detection result (e.g., a correlation value) and a specific threshold value, whether an LTE-U device (e.g., an LTE-U eNB) occupies a radio channel of the UCell. As the comparison result, if it is determined that another LTE-U device occupies the radio channel of the UCell in UL SF #n, the UE may determine that the state of the radio channel of the UCell in UL SF #(n+1) is idle and perform signal/channel (e.g., PUSCH, PUCCH, or PRACH) transmission reserved/scheduled on the UCell in UL SF #(n+1). Meanwhile, if it is determined that a non-LTE-U device occupies the radio channel of the UCell in UL SF #n, the UE may determine that the state of the radio channel of the UCell in UL SF #(n+1) is busy and drop/omit signal/channel transmission reserved/scheduled on the UCell in UL SF #(n+1).

The LTE-U signal, which is a detection target, may be a specific RS (e.g., a discovery RS, a CSI-RS, or a CRS) or a synchronization signal (e.g., a PSS/SSS or a known reservation signal). For more efficient detection, the eNB may pre-signal LTE-U signal transmission related information/parameters to the UE. For example, the LTE-U signal transmission related information/parameters include sequence information constituting the LTE-U signal, a frequency shift of the LTE-U signal, a frequency resource on which the LTE-U signal is transmitted (or on which the LTE-U signal is to be detected), a time resource on which the LTE-U signal is transmitted (or on which the LTE-U signal is to be detected) (e.g., an OFDMA symbol index), and the specific threshold value used to determine the detection result. The LTE-U signal transmission related information/parameters may be cell-commonly or UE-group-commonly configured.

Meanwhile, when DL SF #n has a special SF structure, a UE performing only specific UL signal/channel (e.g., SRS or a PRACH) transmission through the last partial symbols in DL SF #n may also perform the carrier sensing operation based on LTE-U signal detection (in SF #n) similar to the above example.

Case C) eNB Performing Signal/Channel Transmission Through DL SF #(n+1) Immediately after UL SF #n When a signal/channel (e.g., an (E-)PDCCH, PHICH, or PDSCH) to be transmitted is present on a UCell in DL SF #(n+1), the eNB may perform an operation of detecting an LTE-U signal transmitted by the UE in UL SF #n on the UCell. The eNB may determine, through comparison between the detection result (e.g., a correlation value) and a specific threshold value, whether an LTE-U device (e.g., an LTE-U UE) occupies a radio channel of the UCell. As the comparison result, if it is determined that another LTE-U device occupies the radio channel of the UCell in UL SF #n, the eNB may determine that the state of the radio channel of the UCell in DL SF #(n+1) is idle and perform signal/channel transmission on the UCell in DL SF #(n+1). Meanwhile, if it is determined that a non-LTE-U device occupies the radio channel of the UCell in UL SF #n, the eNB may determine that the state of the radio channel of the UCell in DL SF #(n+1) is busy and drop/omit signal/channel transmission on the UCell in DL SF #(n+1). The LTE-U signal, which is a detection target, may be the (PUSCH) DMRS signal or the SRS signal as in Case A.

Meanwhile, upon succeeding in detection of the LTE-U signal through carrier sensing (e.g., when a detection value exceeds the specific threshold value), the LTE-U device (e.g., the UE in Case A/B and the eNB in Case C) performing carrier sensing may perform the following operations.

Alt 1: The LTE-U device may eliminate (or disregard) the LTE-U signal detected in SF #n from a received signal, perform normal energy (or power) detection based carrier sensing on the remaining signal, and finally determine a radio channel state (e.g., idle or busy) of the UCell in SF #(n+1) (or SF #n) according to the carrier sensing result.

Alt 2: Upon succeeding in detection of the LTE-U signal in SF #n, the LTE-U device may determine (without an additional operation) that the radio channel state of the UCell in SF #(n+1) (or SF #n) is idle and then perform a signal transmission operation (e.g., signal/channel transmission reserved/scheduled on the UCell) on the UCell in SF #(n+1) (or SF #n).

On the other hand, upon failing to detect the LTE-U signal in SF #n (e.g., if the detection value is less than the specific threshold value), the LTE-U device may perform normal energy (or power) detection based carrier sensing on a received signal in SF #n and finally determine a radio channel state (e.g., idle or busy) of the UCell in SF #(n+1) (or SF #n) according to the carrier sensing result. If it is determined that the radio channel state of the UCell in SF #(n+1) (or SF #n) is idle, the LTE-U device may perform a signal transmission operation (e.g., signal/channel transmission reserved/scheduled on the UCell) on the UCell in SF #(n+1). If it is determined that the radio channel state of the UCell in SF #(n+1) (or SF #n) is busy, the LTE-U device may drop/omit a signal transmission operation on the UCell in SF #(n+1).

In addition, the LTE-U signal detection based carrier sensing operation may be performed as follows according to implementation of the operation.

Step 1: The LTE-U device may perform normal energy (or power) detection based carrier sensing with respect to a received signal of a UCell in SF #n. If it is determined that the radio channel state of the UCell in SF #(n+1) (or SF #n) is idle as a result of carrier sensing (e.g., comparison between a signal detection result and a specific threshold value), the LTE-U device may perform signal transmission operation (e.g., signal/channel transmission reserved/scheduled on the UCell) on the UCell of SF #(n+1) (or SF #n) and, if it is determined that the radio channel state is busy, the LTE-U device may perform Step 2 described below.

Step 2: The LTE-U device may perform an LTE-U signal detection operation with respect to the received signal of the UCell in SF #n. Upon succeeding in detecting the LTE-U signal (through comparison between the signal detection result and the specific threshold value), the LTE-U device may determine that the radio channel state of the UCell is idle in SF #(n+1) (or SF #n). If it is determined that the radio channel state of the UCell in SF #(n+1) (or SF #n) is idle, the LTE-U device may perform a signal transmission operation (e.g., signal/channel transmission reserved/scheduled on the UCell) on the UCell in SF #(n+1) (or SF #n). Meanwhile, if it is determined that the radio channel state of the UCell in SF #(n+1) (or SF #n) is busy, the LTE-U device may drop/omit the signal transmission operation on the UCell in SF #(n+1) (or SF #n).

While the proposed methods of the present invention have been separately described for convenience, the methods may be used in combination. For example, when an RRP is configured on a UCell in a cell group, the RRP may be configured by the DL/UL mixed RRP configuration scheme proposed in the present invention and signal transmission in the RRP may be performed in a signal transmission process depending on LTE-U signal detection based carrier sensing.

Figure 12:
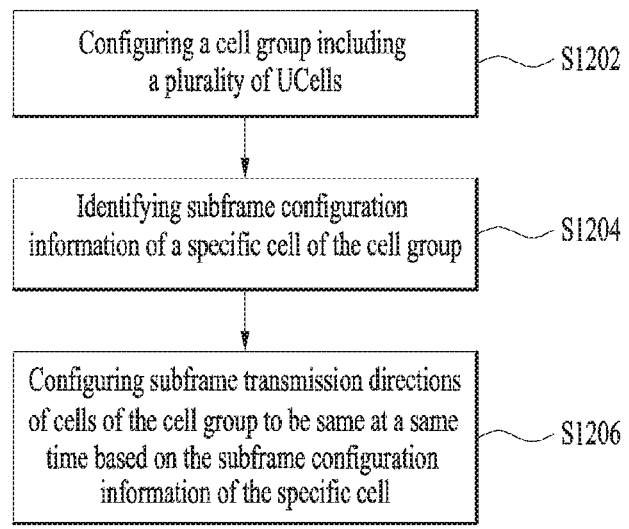
FIG. 12 illustrates a communication procedure according to an embodiment of the present invention.

FIG. 12 illustrates a communication procedure according to an embodiment of the present invention. The present invention may be applied to a 3GPP (3rd Generation Partnership Project) wireless communication system. A description will be given based on a UE for convenience but an associated operation may be performed by an eNB.

Referring to FIG. 12, the UE may configure a cell group including a plurality of UCells (S1202). The UE may identify SF configuration information about a specific cell of the cell group (S1204). Next, the UE may configure SF transmission directions of cells in the cell group to be the same at the same timing, based on the SF configuration information about the specific cell (S1206). Herein, when the cell group includes only UCells, the specific cell may be any one of the UCells in the cell group. The specific UCell may be designated by the eNB upon designating/allocating the cell group. Meanwhile, when the cell group includes an LCell, the specific cell may be the LCell.

Herein, configuring SF transmission directions of cells in the cell group to be the same at the same timing may include configuring RRPs on the UCells in the cell group to be the same and an RRP may indicate a resource temporarily configured on each UCell. In addition, the RRP may include a plurality of contiguous DL SFs and a plurality of contiguous UL SFs subsequent to the DL SFs. Specifically, the RRP may include K1 contiguous DL SFs and subsequent K1 or fewer contiguous UL SFs. In this case, if signal transmission is scheduled in an (n+1)-th SF in the RRP, a signal transmission process is performed according to a carrier sensing result in an n-th SF, wherein, if a signal (e.g., an LTE-U signal) related to a parameter indicated by the eNB in the n-th SF is detected, the UE performs signal transmission in the (n+1)-th SF, and no signal related to the parameter indicated by the eNB is detected in the n-th SF, whether signal transmission is performed in the (n+1)-th SF may be determined according to an energy level in the n-th SF.

The CA method of the present invention may not be limitedly applied only to a cell operating based on an aperiodic RRP configuration such as LTE-U but may be similarly applied to a normal cell operating based on a transmission resource configuration such as in legacy LTE.

Figure 13:
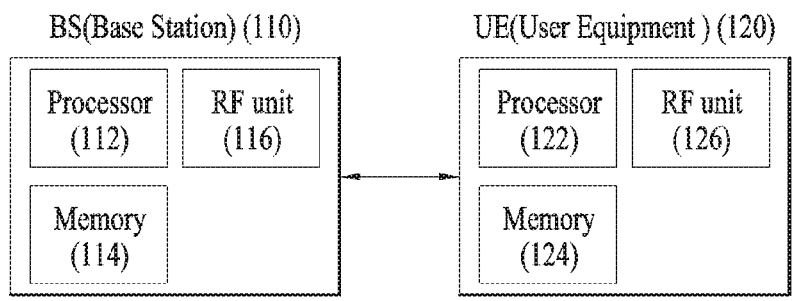
FIG. 13 illustrates a base station and a user equipment applicable to an embodiment of the present invention.

FIG. 13 illustrates a BS and a UE of a wireless communication system, which are applicable to embodiments of the present invention.

Referring to FIG. 13, the wireless communication system includes a BS 110 and a UE 120. When the wireless communication system includes a relay, the BS or UE can be replaced by the relay.

The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention mentioned in the foregoing description may be applicable to a user equipment, a base station, or other devices of wireless mobile communication systems.

What is claimed is:

1. A method of performing communication by a user equipment (UE) in a wireless communication system, the method comprising:
   configuring a cell group including a plurality of unlicensed band cells (UCells);
   identifying configuration information about a specific cell in the cell group;
   configuring reserved resource periods (RRPs) on the UCells in the cell group to be the same at the same timing, based on the configuration information about the specific cell, wherein each of the RRPs includes a plurality of time intervals contiguously configured on a respective UCell; and
   performing a signal transmission process according to a carrier sensing result in an n-th time interval when a signal transmission is scheduled in an (n+1)-th time interval in the RRP,
   wherein, if a signal related to a parameter indicated by a base station (BS) is detected in the n-th time interval, the signal transmission is performed in the (n+1)-th time interval, and
   wherein, if no signal related to the parameter indicated by the BS is detected in the n-th time interval, whether the signal transmission is performed in the (n+1)-th time interval is determined based on an energy level in the n-th time interval.

2. The method according to claim 1, wherein the RRP includes a plurality of contiguous downlink (DL) time intervals and a plurality of contiguous uplink (UL) time intervals subsequent to the DL time intervals.

3. The method according to claim 2, wherein the RRP includes K1 contiguous DL time intervals and K1 or fewer contiguous UL time intervals subsequent to the K1 contiguous DL time intervals.

4. The method according to claim 1, wherein the wireless communication system is a 3rd generation partnership project (3GPP) wireless communication system.

5. The method according to claim 1,
   wherein, if the cell group includes only the UCells, the specific cell is any one of the UCells in the cell group, and
   wherein, if the cell group includes a licensed band cell (LCell), the specific cell is the LCell.

6. A user equipment (UE) for performing communication in a wireless communication system, the UE comprising:
   a radio frequency (RF) module; and
   a processor,
   wherein the processor is configured to
   configure a cell group including a plurality of unlicensed band cells (UCells),
   identify time interval configuration information about a specific cell in the cell group,
   configure transmission directions of cells reserved resource periods (RRPs) on the UCells in the cell group to be the same at the same timing, based on the time interval configuration information about the specific cell, wherein each of the RRPs includes a plurality of time intervals contiguously configured on a respective UCell, and
   perform a signal transmission process according to a carrier sensing result in an n-th time interval when a signal transmission is scheduled in an (n+1)-th time interval in the RRP,
   wherein, if a signal related to a parameter indicated by a base station (BS) is detected in the n-th time interval, the signal transmission is performed in the (n+1)-th time interval, and
   wherein, if no signal related to the parameter indicated by the BS is detected in the n-th time interval, whether the signal transmission is performed in the (n+1)-th time interval is determined according to an energy level in the n-th time interval.

7. The UE according to claim 6,
   wherein the RRP includes a plurality of contiguous downlink (DL) time intervals and a plurality of contiguous uplink (UL) time intervals subsequent to the DL time intervals.

8. The UE according to claim 7,
   wherein the RRP includes K1 contiguous DL time intervals and K1 or fewer contiguous UL time intervals subsequent to the K1 contiguous DL time intervals.

9. The UE according to claim 6, wherein the wireless communication system is a 3rd generation partnership project (3GPP) wireless communication system.

10. The UE according to claim 6,
    wherein, if the cell group includes only the UCells, the specific cell is any one of the UCells in the cell group, and
    wherein, if the cell group includes a licensed band cell (LCell), the specific cell is the LCell.

* * * * *